Patented Oct. 16, 1951

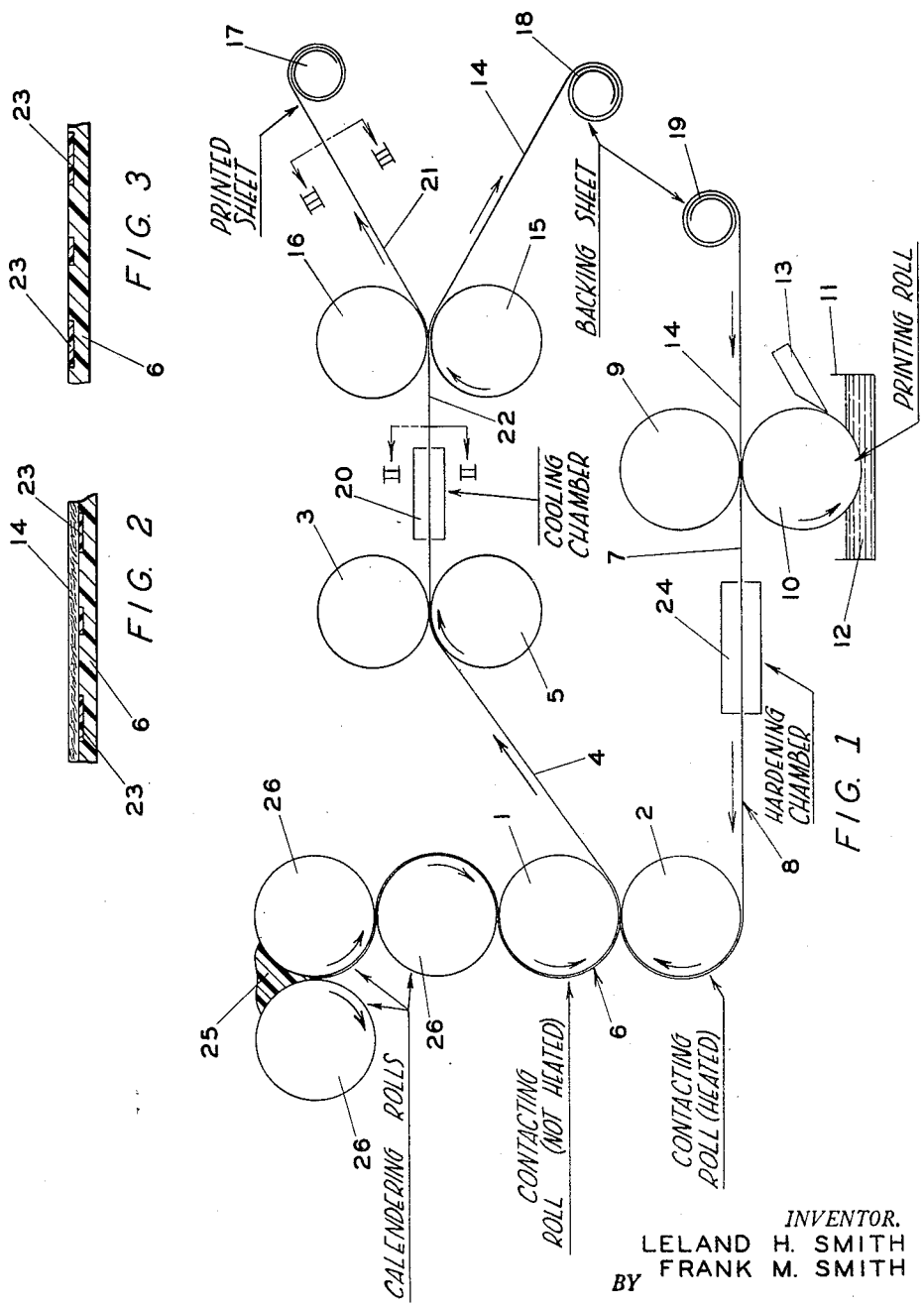

2,571,962

UNITED STATES PATENT OFFICE 2,571,962

PROCESS FOR THE DECORATIVE PRINTING OF POLYVINYL CHLORIDE SHEETS

Leland H. Smith and Frank M. Smith, Granville, N. Y., assignors to The Decora Corporation, Fort Edward, N. Y., a corporation of New York Application November 5, 1947, Serial No. 784,119

5 Claims. (Cl. 154—97.5)

This invention relates to a method for making a figured or decorated thermoplastic sheet, particularly to a method for making a thin, thermoplastic polyvinyl chloride sheet having on its surface a desired figure or design, and characterized by a high degree of accuracy in register of the design and a lack of deformation of the sheet.

The printing of thin, thermoplastic sheets, such as foil and film, is accomplished only with considerable technical difficulty. Many inks used for printing on plastic sheets wear rapidly and may even smudge when printing is carried out in conventional manner. Although some success has been attained in the printing of plastic sheets which are substantially non-elastic, such as sheets of cellulose acetate and cellulose nitrate, the difficulties encountered are far greater when attempts are made to print on elastic thermoplastic sheets, such as calendered polyvinyl chloride sheets. Most thermoplastic sheets, particularly thin, thermoplastic sheets, such as can be made by calendering a high molecular weight plasticized polyvinyl chloride composition, are somewhat elastic and tend to creep, and to be deformed when fed between conventional printing rolls. Such deformation is usually of a permanent nature and the result is entirely unsatisfactory. When it is attempted to print with two or more colors on the same thin, thermoplastic sheet, imperfect register of pattern is invariably obtained using heretofore known processes.

An additional disadvantage encountered in the printing of plastic sheets has been the difficulty of obtaining inks which adhere sufficiently to the sheet or which do not present a raised surface so that they are subject to undue wear and even to parting or peeling from the surface of the sheet. Attempts have been made to use thermoplastic inks and, subsequently, to heat the printed sheet to bond the ink with the sheet, but difficulty has been experienced not only as mentioned previously, but also with the bleeding of the ink during the heating process. Furthermore, it is practically impossible to heat a thin, thermoplastic sheet carrying a thermoplastic ink by heretofore known means without causing a great deal of deformation, or even fusion, of the sheet itself. It is apparent that a convenient and economical method which can be carried out continuously for making a thermoplastic sheet having a smooth surface and with a desired design formed integral with its surface during its manufacture would be of great value.

It is, therefore, an object of the present invention to provide a method for making a figured or decorated thermoplastic sheet.

An additional object is to provide a method for calendering a thermoplastic polyvinyl chloride composition to make a figured thermoplastic sheet.

An additional object is to provide a method for making a thermoplastic polyvinyl chloride sheet carrying on at least one of its surfaces a design composed of a thermoplastic polyvinyl chloride composition integrally bonded to the sheet.

These and related objects are accomplished readily and economically by first calendering a thermoplastic polyvinyl chloride composition to form an incompletely shaped thermoplastic sheet, e. g., a sheet slightly thicker than the sheet desired. The surface of the sheet is then contacted with the surface of a substantially non-elastic sheet, referred to herein variously as a transfer, carrier or backing sheet, having on its contacting surface a design printed in reverse with a thermoplastic polyvinyl chloride printing composition by an intaglio process. The non-elastic sheet is heated just prior to the contacting step to cause the thermoplastic printing composition forming the design in reverse thereon to soften. The contacted sheets are then forwarded between rolls under pressure which press the sheets firmly together to complete the shaping of the thermoplastic sheet and simultaneously, to cause the thermoplastic printing composition on the non-elastic sheet to be firmly bonded to the thermoplastic sheet. The assemblage of the two sheets is then cooled sufficiently to harden the printing composition and the sheets subsequently separated to leave the design firmly bonded to the thermoplastic sheet as an integral part of the surface thereof, the non-elastic sheet being then free of printing composition.

Due to the firm contact between the thermoplastic polyvinyl chloride sheet and the non-elastic sheet from the time they are first brought into contact until they are separated and due to the fact that they travel at the same speed, creeping and movement of any sort of the thermoplastic sheet with respect to the surface of the non-elastic carrier sheet is prevented during the travel of the two contacting sheets and during the cooling step. Deformation of the thermoplastic sheet is avoided and the degree of register and of definition of the design or decoration transferred to the thermoplastic sheet is limited only by the register and definition obtainable in printing the non-elastic sheet. Furthermore, the surface of the thermoplastic sheet in contact with the carrier sheet acquires substantially the contour of the latter and the smoothness of the decorated thermoplastic sheet obtainable is limited in large degree only by the smoothness of the non-elastic sheet used. Actual fusion or bonding of the thermoplastic polyvinyl chloride printing composition forming the design to the thermoplastic polyvinyl chloride sheet is effected, the composition thus becoming an integral part of the sheet.

For a better understanding of the invention, reference is made to the accompanying drawing in which, in the interest of clarity, certain features are shown on a somewhat exaggerated scale, and wherein Figure 1 is a schematic diagram showing one way in which the process of the invention can be carried out, Figure 2 is a fragmentary view in cross-section taken along the line II—II of Figure 1, and Figure 3 is a fragmentary view in cross-section taken along the line III—III of Figure 1.

Referring now to Figure 1, a heated mass of a calenderable thermoplastic polyvinyl chloride composition 25 is fed in conventional fashion into a calendering stack composed in part of conventional calendering rolls 26 and in part of another conventional roll 1, herein referred to as the "main" roll, to produce a calendered, but incompletely shaped sheet 6.

An unprinted, substantially non-elastic sheet 14 from a supply 19 is conducted between printing rolls 9 and 10. One of the printing rolls 10 is engraved for intaglio printing in reverse and dips in a bath of a printing paste composition or ink 12, having a thermoplastic polyvinyl chloride base, in a container 11 beneath the roll. Excess paste is removed by a doctor blade 13 and drains back into the container below.

After leaving the printing roll 10, the printed non-elastic sheet 7, with the paste in a wet or sticky state, is conducted through a hardening zone or chamber 24 wherein it can be heated to remove volatile solvents from the paste or otherwise treated as desired. In certain instances, the chamber can, with advantage, be replaced with rolls contacting the unprinted surface of the printed sheet which can be heated or cooled, as desired, to accomplish substantially the same purpose.

Upon leaving the hardening zone 24, the printted, non-elastic sheet 7 is conducted over the periphery of a heated contacting roll 2 and the sheet thus heated so that the thermoplastic printing composition forming the design on its surface 8 is softened and the heated printed sheet then contacted with the incompletely shaped polyvinyl chloride sheet and conducted in pressure contact with it between the main roll 1 and the contacting roll 2.

The contacting roll 2, which, in cooperation with the main roll 1, effects pressure contact of the printed surface 8 of the non-elastic sheet 7 with the surface of the thermoplastic polyvinyl chloride sheet 6, is heated, e. g., by circulating hot liquid or gas through it, or electrically, or in any other convenient or conventional manner. The temperature of the heated contacting roll 2 is adjusted so that at the moment of contact of the two sheets, the printing composition on the surface of the non-elastic sheet 7 is in a softened condition. The contacting of the heated non-elastic sheet 7 and of the heated printing composition with the thermoplastic sheet 6 under the heated contacting roll 2 serves to heat the surface of the thermoplastic sheet 6 sufficiently so that the design is substantially pressed into its surface and is integrally bonded therewith. The surface of the finished thermoplastic sheet carrying the design integral with its surface assumes substantially the surface characteristics of the non-elastic sheet 7. The shaping of the thermoplastic sheet 6 is also completed during its passage between the rolls 1 and 2 and it emerges as a sheet having the desired thickness.

It is understood that the contacting roll 2 is adjustable with respect to main roll 1 so that clearance between the two can be set for any desired spacing. It is also understood that the amount of reduction in thickness of the thermoplastic sheet 6 upon its passage between these rolls should not be excessive or the accuracy of the design may be somewhat impaired. Generally speaking, a reduction in thickness of the thermoplastic sheet of from about 5 to 10 per cent or more is feasible and in certain instances its thickness may be decreased as much as 25 per cent or more, depending, among other factors, on the particular design being transferred to the thermoplastic sheet. It is further understood that the temperature of the thermoplastic sheet 6, prior to its entry between the rolls 1 and 2, can be adjusted as desired, e. g., by warming the main roll 1 in conventional manner, to provide for optimum conditions for finishing the sheet as to shaping for thickness.

The assemblage 4 of the two sheets pressed firmly together is, after emerging from the rolls 1 and 2, conveyed, if desired, between other supplementary sets of rolls, such as rolls 3 and 5, where they can be further heated, although this may not always be necessary. Any desired number of such pairs of rolls can be employed. The assemblage is eventually cooled, e. g., by being conveyed through a cooling zone, such as a chamber 20, where it is cooled to a temperature below the setting temperature of the thermoplastic printing composition.

The cooled composite structure 22, can, if desired, be conducted to a wind-up roll and the wound up structure stored or shipped in this form, the non-elastic backing sheet offering considerable protection to the decorated thermoplastic sheet during this time. Prior to use, the decorated thermoplastic sheet can be stripped from the non-elastic sheet.

In the modification shown in Figure 1, the cooled composite structure 22 is conveyed between a pair of rolls 15 and 16 and the decorated thermoplastic sheet 21 and the clean non-elastic backing sheet 14 then led away from the rolls at a divergent angle to separate wind-up rolls 17 and 18. The roll of recovered non-elastic sheet on wind-up roll 18, can, if desired, be removed at frequent intervals and substituted for the supply roll 19 and the sheet thus re-used.

The structure of the composite sheet 22, prior to stripping the decorated thermoplastic sheet from the non-elastic sheet, is illustrated by the fragmentary cross-section of Figure 2 wherein a non-elastic sheet 14 is shown in intimate contact with the surface of a thermoplastic polyvinyl chloride sheet 6, the thermoplastic polyvinyl chloride printing composition constituting the design 23 on the surface of the thermoplastic sheet being shown as substantially imbedded in and bonded to the thermoplastic sheet 6.

The structure of the decorated thermoplastic sheet 21 after it has been stripped from the non-flexible sheet 14 is illustrated by the fragmentary cross-section of Figure 3 wherein the thermoplastic sheet 6 carries the printing composition 23 constituting the design on one of its surfaces substantially imbedded in the surface and bonded to the thermoplastic sheet, the entire structure presenting a uniform, smooth, unblemished surface.

It is apparent from the foregoing description of the invention that the non-elastic sheet can be printed with substantially any desired design and that multi-colored polyvinyl chloride base printing pastes can be used. In the latter instance, a pair of printing rolls, duplicating printing rolls 9 and 10, can be used for each color in conventional manner. In such instance, the first printing should be treated, as described, to harden the ink before the second ink is applied. In this manner, bleeding of one ink into another is avoided. The non-elastic sheet can be printed by rotogravure, hand painting, screen-printing or other equivalent intaglio process.

It is also apparent from the preceding description that the substantially non-elastic backing or carrier sheet can be composed of any one of a number of substances, it being only necessary that it be substantially non-elastic at the bonding temperature and that it be strong enough and have sufficiently poor adhesion for the hardened thermoplastic printing composition and thermoplastic sheet to enable it to be stripped easily from the cold figured thermoplastic sheet. Carrier sheets which have been used with entire satisfaction include thin sheets of strong fibrous material with a non-absorptive surface, such as glassine, silicate coated paper and many others. Non-thermoplastic resinous sheets of various sorts, such as regenerated cellulose, can also be used, but suffer from the disadvantage of being easily torn and often difficult to strip from the printed thermoplastic sheet. A glassine or paper base carrier sheet is preferred due to its low cost and low degree of elasticity. Thin metal sheets can be used, if desired.

Although the method of the invention is capable of considerable variation in certain respects, certain essential features should be understood thoroughly. The thermoplastic polyvinyl chloride composition used for forming the sheet should be a composition suitable for calendering. Such compositions usually contain at least 50 per cent by weight, and often as much as 90 to 95 per cent, of polyvinyl chloride based on the resinous content of the composition. The composition can contain substantial proportions of polymerized vinyl acetate, vinylidine chloride, acrylonitrile or other resin compatible with polyvinyl chloride either by co-polymerization or by compounding therewith, as well as combinations thereof. Such compositions are ordinarily referred to as "high molecular weight" polyvinyl chloride compositions and are of limited solubility in many solvents. Thermoplastic polyvinyl chloride sheets of substantially any thickness can be made by the process of the invention.

It is also essential that the composition from which the thermoplastic sheet is calendered be suitably plasticized to impart sufficient flexibility thereto. Generally speaking, the composition should contain less than about 45 per cent and more than about 15 per cent, preferably from about 25 to about 40 per cent, of plasticizer, depending upon the particular resinous composition and the particular plasticizer employed.

Plasticizers which can be employed include dioctyl phthalate, dibutyl phthalate, dioctyl sebacate, tricresyl phosphate, modified alkyd resins and many others well known in the art as being employed frequently in polyvinyl chloride compositions which are to be calendered into sheets. The term "plasticized thermoplastic polyvinyl chloride sheet" or "plasticized thermoplastic polyvinyl chloride composition" as used herein is to be interpreted as referring to sheets or compositions having the characteristics as to resin and plasticizer content just described.

The thermoplastic polyvinyl chloride composition used in preparing the printing paste used in the method of the invention differs in certain important respects from the composition used in making the thermoplastic sheet. Although the same resins and proportions thereof as mentioned in the description of the thermoplastic sheet can be used, and in many instances preferably are used, in preparing the printing paste the resinous component of the printing composition should be of the type ordinarily referred to as a "low-molecular weight" polymer or co-polymer. Such substances have generally a lower softening temperature than the high-molecular weight polymers used in the thermoplastic sheet and are more soluble in many organic solvents. The printing paste is prepared by dissolving the low molecular weight resin base in an organic liquid, such as methyl ethyl ketone, methyl isobutyl ketone, mesityl oxide, cyclohexanone or other known solvent for such resin mixture, and incorporating a pigment therewith. Suitable pigments include titanium dioxide, monastral blue or green, cadmium yellow, molybdate orange, phthalocyanine blues and greens, chrome colors and many others. Soluble colors are to be avoided. The printing paste is made up without the use of a plasticizer to a suitable printing consistency and usually contains from 10 to 30 parts by weight of resin to each 90 to 70 parts of solvent. Diluents, such as toluene, can be included, if desired. Pigments are included to give the shade desired and may vary from small amounts up to as much as two pounds or more per gallon of paste. The printing composition and the thermoplastic sheet should be of such compositions as to be bondable with one another.

By avoiding the use of a plasticizer in the printing composition, an unusually "dry" print is obtained on the carrier or transfer sheet and the printed sheet can be rolled up tightly and stored indefinitely without danger of sticking. When a decorated thermoplastic polyvinyl chloride sheet is formed using such an unplasticized composition as the printing composition, a sufficient amount of the plasticizer from the thermoplastic sheet diffuses into the thin layer of printing composition during the bonding of the two, or even later upon standing, to plasticize the printing composition. If a plasticizer is used in making up the printing paste, it has been found that invariably the printed design thereon tends to become tacky upon standing and many attendant difficulties result.

Special attention is directed to the importance of using a thermoplastic printing composition having a softening temperature not substantially higher, e. g., not more than about 10° C higher, than the softening temperature of the calendered thermoplastic sheet. This is especially true in the case of thin thermoplastic sheets, e. g., sheets not more than about 4 to 6 mils thick. If such condition is not observed sufficient heat will be stored in the non-elastic sheet and printing composition prior to contact thereof with the thermoplastic sheet to cause the latter to soften to such a degree as to interfere seriously with the process. Generally speaking, it is preferable to use a polyvinyl chloride resin in the printing composition having a softening point substantially below that of the thermoplastic sheet.

In a typical instance of the operation of the process, a mass of a high molecular weight calenderable thermoplastic polyvinyl chloride composition, consisting of about 63 per cent of polyvinyl chloride, 2 per cent of polyvinyl acetate and 35 per cent of dioctyl phthalate as a plasticizer, was calendered to form a continuous sheet about 4.2 mils thick and immediately contacted under pressure with the printed surface of a heated glassine sheet. The glassine sheet was printed by feeding it continuously through a rotogravure press.

The printing paste, or ink, used in printing the design on the sheet was prepared by dissolving about 20 per cent by weight of a low molecular weight unplasticized polyvinyl chloride composition, consisting of about 95 per cent polyvinyl chloride and about 5 per cent polyvinyl acetate, in about 80 parts of methyl ethyl ketone. A titanium dioxide pigment was added at the rate of about 1.5 pounds per gallon.

The glassine sheet was conducted from the press through a slightly heated zone in which the methyl ethyl ketone was evaporated leaving a design consisting of the unplasticized resin and pigment on the sheet. The sheet was then conducted around a roll heated to a few degrees above the softening temperature of the printing composition on the sheet. The heated sheet was then brought into pressure contact, between the heated roll and the last roll of the calender stack, with the partially calendered thermoplastic polyvinyl chloride sheet having a thickness of about 4.2 mils. The clearance of the rolls was adjusted so that the thickness of the thermoplastic sheet was reduced to about 4.0 mils during its passage between them.

The assemblage consisting of the two sheets in intimate contact and adhering lightly together was then cooled, rolled up and stored. The glassine sheet was subsequently stripped from the thermoplastic sheet. The surface of the glassine sheet was free of resinous composition and was subsequently re-used in the process. The thermoplastic sheet contained the design originally printed in reverse on the glassine sheet integrally bonded to its surface. The figured surface was smooth and free from tackiness and the sheet could be rolled up and stored without sticking.

Similar results were obtained when the glassine sheet was printed in multiple color using a multi-color press, the thermoplastic sheet emerging carrying a multi-color design having sharp definition and a high degree of accuracy in register.

Although the invention has been described with special reference to a printing paste containing a volatile solvent, it should be pointed out that one modification of the invention contemplates the employment of the polyvinyl chloride printing composition mixed in a fused or molten state with a pigment and without the use of a volatile solvent, but using suitably heated printing rolls 9 and 10. In such instance, the printed, non-elastic sheet 7 carrying the printed design in reverse on one of its surfaces 8, can be conducted directly and without substantial cooling from printing roll 10 over a contacting roll 2 into pressure contact with the incompletely shaped thermoplastic sheet 6, the remainder of the process being carried out as previously described. In this way, the hardening step and subsequent softening step are avoided.

The term "printing composition" as used herein refers to the hardened composition comprising a polyvinyl chloride resin and pigment as carried on the non-elastic flexible sheet, but does not include the volatile solvent present in the printing paste. The term "printing paste" as used herein refers to the paste comprising a polyvinyl chloride resin, a pigment and a volatile solvent as used in the printing step. The term "polyvinyl chloride resin" as used herein refers to polymers and co-polymers of vinyl chloride within the limits herein defined.

We claim:

1. The method of making a figured thermoplastic sheet which includes: calendering a plasticized thermoplastic polyvinyl chloride composition to produce an incompletely shaped thermoplastic elastic sheet; heating a flexible, substantially non-elastic continuous carrier sheet printed with an unplasticized thermoplastic polyvinyl chloride printing composition to cause softening of the printing composition; thereafter progressively contacting the printed surface of the heated non-elastic sheet with the surface of the partially preformed thermoplastic elastic sheet under pressure to cause completion of the shaping of the thermoplastic elastic sheet and imbedding the printing composition therein; cooling the contacted sheets to a temperature below the setting point of the printing composition; and, subsequently, stripping the non-elastic sheet from the figured thermoplastic shaped elastic sheet.

2. The method of claim 1 wherein the heating step is carried out by heating the non-contacting surface of the non-elastic sheet.

3. The method of claim 1 wherein the softening temperature of the thermoplastic printing composition is not substantially higher than the softening temperature of the thermoplastic elastic sheet.

4. In a process for the decorative printing of polyvinyl chloride sheets, the improvement which comprises: calendering a plasticized thermoplastic polyvinyl chloride composition to produce an incompletely shaped thermoplastic elastic sheet; contacting, under pressure, a surface of said incompletely shaped thermoplastic elastic sheet with the surface of a heated, flexible, substantially non-elastic continuous carrier sheet, having reverse intaglio printing of an unplasticized thermoplastic polyvinyl chloride printing composition on the contacting surface of the said carrier sheet; the said contacting causing complete shaping of the elastic sheet and causing bonding of the printing composition within the surface of said elastic sheet; cooling the contacted sheet to a temperature below the setting point of the printing composition; and, thereafter removing the said substantially non-elastic continuous carrier sheet, leaving a polyvinyl chloride sheet having a substantially unblemished decorated surface.

5. In a process for the decorative printing of polyvinyl chloride sheets, the improvement which comprises: calendering a plasticized thermoplastic polyvinyl chloride composition to produce an incompletely shaped thermoplastic elastic sheet; contacting, under pressure, a cooled surface of said incompletely shaped thermoplastic elastic sheet with the surface of a heated, flexible, substantially non-elastic continuous carrier sheet having reverse intaglio printing of an unplasticized thermoplastic polyvinyl chloride printing composition on the contacting surface of said carrier sheet; said carrier sheet being heated to a temperature slightly above the softening point of the polyvinyl chloride printing composition; the said contacting causing complete shaping of the elastic sheet and causing bonding of the printed composition within the surface of said plastic sheet; cooling the contacted sheet to a temperature below the setting point of the printing composition; and, thereafter removing the said substantially non-elastic continuous carrier sheet from a completely shaped polyvinyl chloride sheet having a substantially unblemished, decorated surface.

LELAND H. SMITH.
FRANK M. SMITH.

REFERENCES CITED

The following references are of record in the file of this patent:

UNITED STATES PATENTS

| Number | Name | Date |
|---|---|---|
| 1,611,218 | Mell | Dec. 21, 1926 |
| 2,001,389 | Kratz | May 14, 1935 |
| 2,131,330 | Akinari | Sept. 27, 1938 |
| 2,339,775 | Ether | Jan. 25, 1944 |
| 2,358,176 | MacDonald | Sept. 12, 1944 |
| 2,404,073 | Karfiol et al. | July 16, 1946 |
| 2,477,300 | Karfiol et al. | July 26, 1949 |
| 2,510,750 | Marquardt | June 6, 1950 |

FOREIGN PATENTS

| Number | Country | Date |
|---|---|---|
| 562,573 | Great Britain | July 6, 1944 |